US008829481B2

(12) United States Patent
Bouverie et al.

(10) Patent No.: US 8,829,481 B2
(45) Date of Patent: Sep. 9, 2014

(54) TOP OF FORM SENSOR

(71) Applicants: Datamax-O'Neil Corporation, Orlando, FL (US); Marjorie Hitz, Rock Hill, SC (US)

(72) Inventors: William M. Bouverie, Windermere, FL (US); Mark Allen Hitz, Rock Hill, SC (US)

(73) Assignee: Datamax-O'Neil Corporation, Orlando, FL (US)

( * ) Notice: Subject to any disclaimer, the term of this patent is extended or adjusted under 35 U.S.C. 154(b) by 124 days.

(21) Appl. No.: 13/655,598

(22) Filed: Oct. 19, 2012

(65) Prior Publication Data

US 2013/0099142 A1 Apr. 25, 2013

Related U.S. Application Data

(60) Provisional application No. 61/549,473, filed on Oct. 20, 2011.

(51) Int. Cl.
*G01N 21/86* (2006.01)

(52) U.S. Cl.
USPC .................................................... 250/559.44

(58) Field of Classification Search
CPC ............ B65H 2220/01; B65H 2220/02; B41J 11/0095; G01B 11/02; G01N 21/8901
USPC .................................................... 250/559.44
See application file for complete search history.

(56) References Cited

U.S. PATENT DOCUMENTS

| | | | |
|---|---|---|---|
| 4,143,977 | A | 3/1979 | Kurihara et al. |
| 4,177,731 | A | 12/1979 | Kleist et al. |
| 4,788,558 | A | 11/1988 | Caldwell et al. |
| 4,788,559 | A | 11/1988 | Ende |
| 4,872,659 | A | 10/1989 | Kato et al. |
| 4,924,240 | A | 5/1990 | Herbert et al. |
| 4,991,846 | A | 2/1991 | Sondej |
| 5,028,155 | A | 7/1991 | Sugiura et al. |
| 5,087,137 | A | 2/1992 | Burnard et al. |
| 5,206,662 | A | 4/1993 | Fox et al. |

(Continued)

FOREIGN PATENT DOCUMENTS

JP 04552558 B2 9/2010

OTHER PUBLICATIONS

Written Opinion of the International Searching Authority, PCT/US2012/036297, Jul. 17, 2012.

(Continued)

*Primary Examiner* — Thanh Luu
(74) *Attorney, Agent, or Firm* — Carter, DeLuca, Farrell & Schmidt, LLP

(57) ABSTRACT

A sensing apparatus operable for sensing top of form indicators on media within a print station is provided. The sensing apparatus generally including a base and a cover hingedly attached to each other and being operable for manipulation between an open and closed position, a flexible circuit affixed to the interior surfaces of the base and cover, the flexible circuit comprising an array of optical sensing devices, and an interface connector integral the base for connection to a control unit of a print station. The optical sensing devices generally include any one of light emitting diodes and photo sensors and are operable for the detection of holes, notches, black marks and gaps located on a media passing through the sensing apparatus.

18 Claims, 4 Drawing Sheets

(56) References Cited

U.S. PATENT DOCUMENTS

| | | | | |
|---|---|---|---|---|
| 5,260,583 | A * | 11/1993 | Rye .......................... | 250/559.42 |
| 5,326,182 | A | 7/1994 | Hagstrom | |
| 5,397,192 | A | 3/1995 | Khormaee | |
| 5,468,076 | A | 11/1995 | Hirano et al. | |
| 5,490,638 | A | 2/1996 | Driftmyer et al. | |
| 5,564,841 | A | 10/1996 | Austin et al. | |
| 5,600,350 | A | 2/1997 | Cobbs et al. | |
| 5,650,730 | A | 7/1997 | Herbst, Jr. | |
| 5,684,516 | A | 11/1997 | Cseledy et al. | |
| 5,790,162 | A | 8/1998 | Adams et al. | |
| 5,820,280 | A | 10/1998 | Fox | |
| 5,836,704 | A | 11/1998 | Lau et al. | |
| 5,870,114 | A | 2/1999 | Numata et al. | |
| 5,872,585 | A | 2/1999 | Donato et al. | |
| 5,874,980 | A | 2/1999 | West | |
| 5,909,233 | A | 6/1999 | Hamman et al. | |
| 5,927,875 | A | 7/1999 | Lau et al. | |
| 5,978,004 | A | 11/1999 | Ehrhardt | |
| 5,995,128 | A | 11/1999 | Adams et al. | |
| 6,014,229 | A | 1/2000 | Yun | |
| 6,020,906 | A | 2/2000 | Adams et al. | |
| 6,034,708 | A | 3/2000 | Adams et al. | |
| 6,057,870 | A | 5/2000 | Monnier et al. | |
| 6,070,048 | A | 5/2000 | Nonaka et al. | |
| 6,082,914 | A | 7/2000 | Barrus et al. | |
| 6,095,704 | A | 8/2000 | Jaeger et al. | |
| 6,099,178 | A | 8/2000 | Spurr et al. | |
| 6,129,463 | A | 10/2000 | Lau et al. | |
| 6,201,255 | B1 | 3/2001 | Torchalski et al. | |
| 6,283,024 | B1 | 9/2001 | George | |
| 6,289,730 | B1 | 9/2001 | Elgee | |
| 6,302,604 | B1 | 10/2001 | Bryant et al. | |
| 6,389,241 | B1 | 5/2002 | Cernusak et al. | |
| 6,396,070 | B1 | 5/2002 | Christensen et al. | |
| 6,520,614 | B2 | 2/2003 | Kaneko | |
| 6,616,362 | B2 | 9/2003 | Bouverie et al. | |
| 6,825,864 | B2 | 11/2004 | Botten et al. | |
| 6,840,689 | B2 | 1/2005 | Barrus et al. | |
| 6,846,121 | B2 | 1/2005 | Bouverie et al. | |
| 6,857,714 | B2 | 2/2005 | Hohberger et al. | |
| 6,900,449 | B2 | 5/2005 | Bolash et al. | |
| 6,942,403 | B2 | 9/2005 | Hohberger et al. | |
| 7,042,478 | B2 | 5/2006 | Bouverie et al. | |
| 7,071,961 | B2 | 7/2006 | Ullenius et al. | |
| 7,079,168 | B2 | 7/2006 | Ullenius et al. | |
| 7,150,572 | B2 | 12/2006 | McNestry et al. | |
| 7,162,460 | B2 | 1/2007 | Cleckler et al. | |
| 7,205,561 | B2 | 4/2007 | Chelvayohan et al. | |
| 7,255,343 | B2 | 8/2007 | So | |
| 7,375,832 | B2 | 5/2008 | Bouverie et al. | |
| 7,456,995 | B2 | 11/2008 | Stephens | |
| 7,502,042 | B2 | 3/2009 | Hitz et al. | |
| 7,537,404 | B2 | 5/2009 | Bouverie et al. | |
| 7,600,684 | B2 | 10/2009 | Tobin et al. | |
| 7,667,874 | B2 | 2/2010 | MacDonald et al. | |
| 7,699,550 | B2 | 4/2010 | Bouverie et al. | |
| 7,824,116 | B2 | 11/2010 | Lyman | |
| 7,845,632 | B2 | 12/2010 | Windsor et al. | |
| 7,857,414 | B2 | 12/2010 | Eun et al. | |
| 7,876,223 | B2 | 1/2011 | Yamaguchi et al. | |
| 7,891,892 | B2 | 2/2011 | Chiu | |
| 7,907,159 | B2 | 3/2011 | Matsuo et al. | |
| 7,934,881 | B2 | 5/2011 | Lodwig et al. | |
| 7,938,501 | B2 | 5/2011 | Takamiya et al. | |
| 8,142,087 | B2 | 3/2012 | Kugimachi | |
| 2001/0008612 | A1 | 7/2001 | Liljestrand et al. | |
| 2003/0081024 | A1 | 5/2003 | Vives et al. | |
| 2003/0141655 | A1 | 7/2003 | Bryer | |
| 2004/0008365 | A1 | 1/2004 | Hobbs | |
| 2004/0114024 | A1 | 6/2004 | Bouverie et al. | |
| 2004/0165927 | A1 | 8/2004 | Fisher et al. | |
| 2005/0002715 | A1 | 1/2005 | Fries et al. | |
| 2005/0189693 | A1 | 9/2005 | Ko | |
| 2005/0190368 | A1 | 9/2005 | Ehrhardt, Jr. et al. | |
| 2005/0204940 | A1 | 9/2005 | Elliott et al. | |
| 2006/0007295 | A1 | 1/2006 | Ueda | |
| 2006/0045601 | A1 | 3/2006 | Endo | |
| 2006/0055721 | A1 | 3/2006 | Burdette et al. | |
| 2006/0157911 | A1 | 7/2006 | Learmonth et al. | |
| 2006/0159504 | A1 | 7/2006 | Blanchard, Jr. et al. | |
| 2006/0180737 | A1 | 8/2006 | Consiglio | |
| 2007/0022233 | A1 | 1/2007 | Bridges et al. | |
| 2007/0040326 | A1 | 2/2007 | Noda et al. | |
| 2007/0059078 | A1 | 3/2007 | Silverbrook et al. | |
| 2007/0138738 | A1 | 6/2007 | Motohashi et al. | |
| 2009/0038495 | A1 | 2/2009 | Butzen et al. | |
| 2009/0103806 | A1 | 4/2009 | Nakami | |
| 2009/0244584 | A1 | 10/2009 | McGarry et al. | |
| 2010/0066782 | A1 | 3/2010 | Yamamoto et al. | |
| 2010/0169513 | A1 | 7/2010 | Levin | |
| 2010/0247222 | A1 | 9/2010 | Bouverie et al. | |
| 2010/0319561 | A1 | 12/2010 | Colquitt et al. | |
| 2011/0042883 | A1 | 2/2011 | Wang et al. | |
| 2011/0132643 | A1 | 6/2011 | Hattori et al. | |

OTHER PUBLICATIONS

Written Opinion of the International Searching Authority, PCT/US2012/039043, Aug. 3, 2012.
Written Opinion of the International Searching Authority, PCT/US2012/041093, Aug. 7, 2012.
Written Opinion of the International Searching Authority, PCT/US2012/043734, Sep. 21, 2012.
Written Opinion of the International Searching Authority, PCT/US2012/043709, Sep. 21, 2012.
Written Opinion of the International Searching Authority, PCT/US2012/043772, Sep. 14, 2012.
Written Opinion of the International Searching Authority, PCT/US2012/046712, Oct. 5, 2012.
Written Opinion of the International Searching Authority, PCT/US2012/049417, Nov. 2, 2012.
Written Opinion of the International Searching Authority, PCT/US2012/050938, Nov. 6, 2012.
Written Opinion of the International Searching Authority, PCT/US2012/060956, Jan. 11, 2013.
Written Opinion of the International Searching Authority, PCT/US2012/066291, Feb. 5, 2013.

* cited by examiner

TOP OF FORM SENSOR

CROSS-REFERENCE TO RELATED APPLICATION(S)

This application claims priority to provisional patent application No. 61/549,473, filed Oct. 20, 2011, and entitled "Top of Form Sensor", the contents of which are incorporated in full by reference herein.

FIELD OF INVENTION

The present invention generally relates to the field of image forming apparatus and devices, and in particular, to label printers printing on multiple labels sequentially carried by a moving web along a media path between a printhead and a sensor operable for sensing holes or notches in the media, locating a leading edge or gap located on the media, and reading black marks on either the top or bottom of the media.

BACKGROUND

Printing systems such as copiers, printers, facsimile devices or other systems having a print engine for creating visual images, graphics, texts, etc. on a page or other printable medium typically include various media feeding and sensing systems for introducing original image media or printable media into the system and monitoring the media as it traverses a media path. Examples include thermal transfer printers. Typically, a thermal transfer printer is a printer which prints on media by melting a coating of ribbon so that it stays glued to the media on which the print is applied. It contrasts with direct thermal printing where no ribbon is present in the process. Typically, thermal transfer printers comprise a supply spindle operable for supplying a media web and ribbon, a print station, and a take up spindle. New ribbon and media is fed from the supply spindle to the print station for printing and then the ribbon is wound up by the take up spindle while the media is exited from the print station. The media path typically includes a top-of-form (top of label) sensor operable for sensing holes or notches in the media, locating a leading edge or gap located on the media, or reading black marks on either the top or bottom of the media.

Thermal transfer printers typically provide two ways in which to locate the top-of-form of certain media. Conventional methods and apparatus for such location is dependent upon the type of media or label being printed on. Most labels have a ⅛th inch gap between each label. In these cases, the printer typically utilizes a transmissive or gap sensor located adjacent the entrance of the printhead along the media feed path. This sensor shines a light at the label while another sensor measures how much light is getting through. More light gets though the gap between labels letting the printer know where the top-of-form is. The same type of sensor works when the media type includes holes or notches on one side.

The second type of sensor that may be relied upon by conventional devices is a reflective or mark sensor. This type of sensor is used for media that has a black line on the back. Instead of shining light through the label it shines light on the bottom of the media and monitors how much light is reflected back. When the light hits the black line the light level changes, letting the printer know where the top-of-form is.

Undesirably, current top of form sensing apparatus and methods do not provide for versatility in the media type used. It would, therefore, be desirable to provide a sensor operable for sensing holes or notches in media, locating a leading edge or gap located on media, and reading black marks or other symbols on either the top or bottom of media. It would further be desirable to provide a sensor having a resolution of sensor locations that is fine enough such that the overall sensor assembly can be fixed in single location requiring no adjustments. Still further, it would be desirable to provide a top-of-form sensor can easily be removed or installed in a printer for cleaning and maintenance.

SUMMARY OF THE INVENTION

The present invention is designed to overcome the deficiencies and shortcomings of the devices and assemblies conventionally known and described above. The present invention is designed to reduce the manufacturing costs and the complexity of assembly. In all exemplary embodiments, a top of form sensor is provided operable for removable installation within a print station and to determine a location of an initial portion of a media web fed to the print station and to properly align printed information onto media. In exemplary embodiments, the top of form sensor may also determine and provide a signal when the initial portion of the media web is located at a desired location within the print station.

In exemplary embodiments, a top of form sensor is provided and is an optical sensor which includes a base hinged to a cover. A flexible circuit is communicably fixed to the base and cover and may include an array of light emitting diodes (LEDs), photo sensors, and/or other notification and sensing means that permit for sensing indicators on media. In exemplary embodiments, the sensing means may be positioned at various locations or sensing points along the length of the base and cover to enable a desired detection. The resolution of the sensing locations are fine enough such that assembly can be fixed in a single location without the necessity of adjustment. The top of form sensor may be capable of sensing any one of the following indicators: black marks on the top side or under side of the media, holes through or slots on the side of the media, top edges of label stock media, notches, and any other errors, inconsistencies, or faults which may arise relative to positioning of and/or printing on the media. In exemplary embodiments, the top of form sensor removably installed in the print station and focused on a reserved area of a media web which is provided with a top of form mark. In exemplary embodiments, the sensor may be connected to a printer control unit via a interface connector to assist in achieving form alignment and determination of the presence of an unprinted media portion or label. The use of the interface connector provides a plug-in-play type set up and allows for easy removal for maintenance of both the print station and the sensor.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

BRIEF DESCRIPTION OF THE DRAWINGS

The present subject matter may take form in various components and arrangements of components, and in various steps and arrangements of steps. The appended drawings are only for purposes of illustrating exemplary embodiments and are not to be construed as limiting the subject matter.

DETAILED DESCRIPTION OF THE PREFERRED EMBODIMENT

Figure 1:
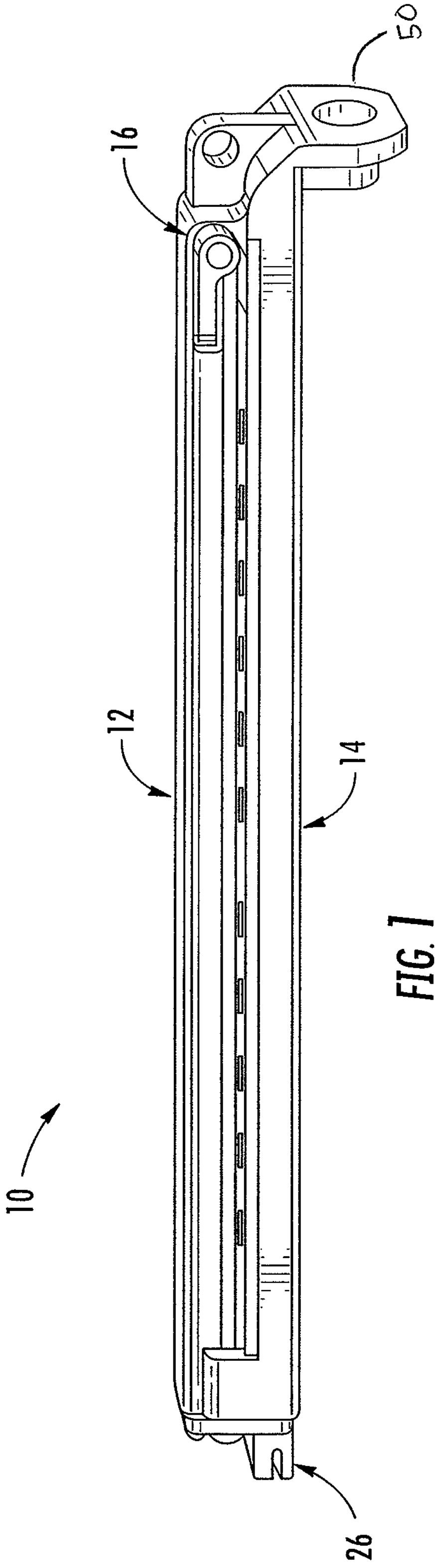
FIG. 1 is a perspective view of the top of form sensor of the present invention.

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Further, as used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

Referring now to FIGS. 1-4, a top of form sensor assembly 10 is provided. The sensor 10 is operable for installation and removal within a print station 100. In exemplary embodiments, the sensor 10 may be installed within the print station 100 in a "plug in play" type manner. In other exemplary embodiments, the sensor 10 may be installed along a media feed path adjacent the print station 100 entrance and is operable for sensing a variety of media indicators, including but not limited to, holes, slots, notches, gaps in label stock, or black marks. In exemplary embodiments, the sensing means may be positioned at various locations or sensing points along the length of a base or cover of the sensor 10 to enable a desired detection across the entire media width. The resolution of the sensing locations are fine enough such that assembly can be fixed in a single location without the necessity of adjustment.

As depicted in FIGS. 1-4, the sensor assembly 10 includes a cover 12 and a base 14. In exemplary embodiments, the cover 12 and base 14 are connected to each other via a hinge 16 such that they may be manipulated between an open and closed position. However, it will be appreciated by those skilled in the art that the manner of connection of the cover 12 and base 14 may vary. Advantageously, by permitting the base 14 and cover 12 to be easily opened and closed in the disclosed manner, cleaning and maintenance of the sensor assembly 10 is made more efficient.

Figure 2:
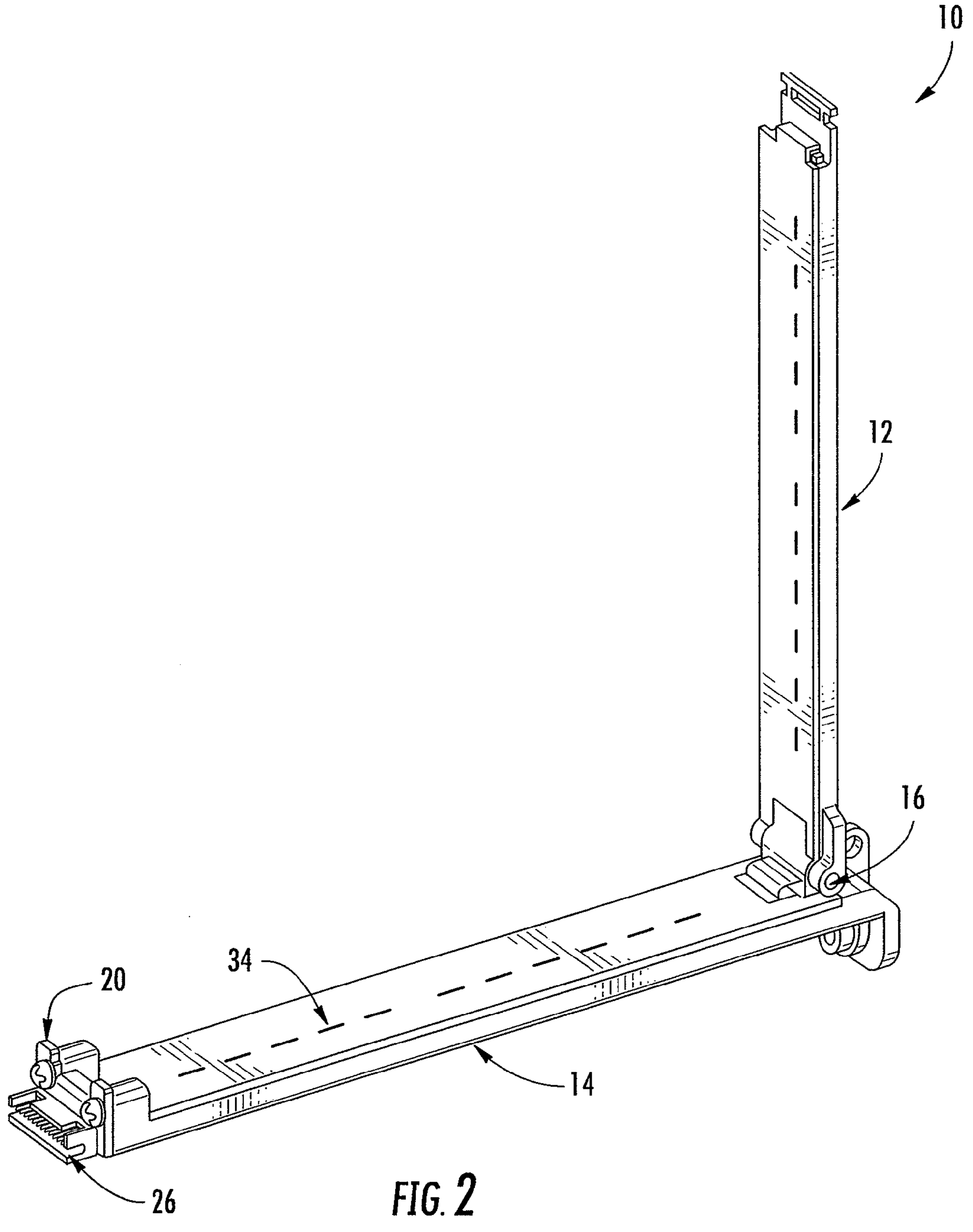
FIG. 2 is a perspective view of the top of form sensor of the embodiment of FIG. 1 shown in the open position.

Along the interior surfaces of each of the cover 12 and base 14 are provided at least one flexible circuit board 22. Provided along the flexible circuit board 22 is an array of optical sensing devices 18 to enable the detection of holes, slots, black marks, gaps between label stock, or notches over the entire media width. As best shown in FIG. 3, the optical sensing devices 18 comprise upper and lower portions 19A and 19B which are affixed to the cover 12 and base 14 portions of the sensor assembly 10. Further, the optical sensing devices 18 may include an array or plurality of light emitting diodes (LEDs), photo devices/sensors, and/or other notification and sensing means that permit for sensing indicators on media. In exemplary embodiments wherein the optical sensing devices 18 include LEDs, the light beams emitted from the LEDs have a predetermined intensity and wavelength for penetrating media passing through the sensor assembly 10. In other exemplary embodiments, the configuration of the optical sensing devices' 18 locations is such that the sensor assembly 10 can be fixed in single location at the print station 100 so that no adjustments are required. As best shown in FIG. 2, in exemplary embodiments, guides 20 are be provided to the base 14 for aligning the upper and lower portions 19A, 19B of the optical sensing devices 18 when being manipulated to a closed position. In exemplary embodiments, the guides 20 may be equipped with locking features. Advantageously, the use of the flexible circuit board 22 allows for opening and closing of the sensor assembly 10, aligns the optical devices 18 properly and also contains circuitry for multiplexing the output signals. In exemplary embodiments, the face of inserts on the flexible circuit board 22 surrounding the optical sensing devices 18 is highly textured to prevent media or label stock from sticking.

Figure 4:
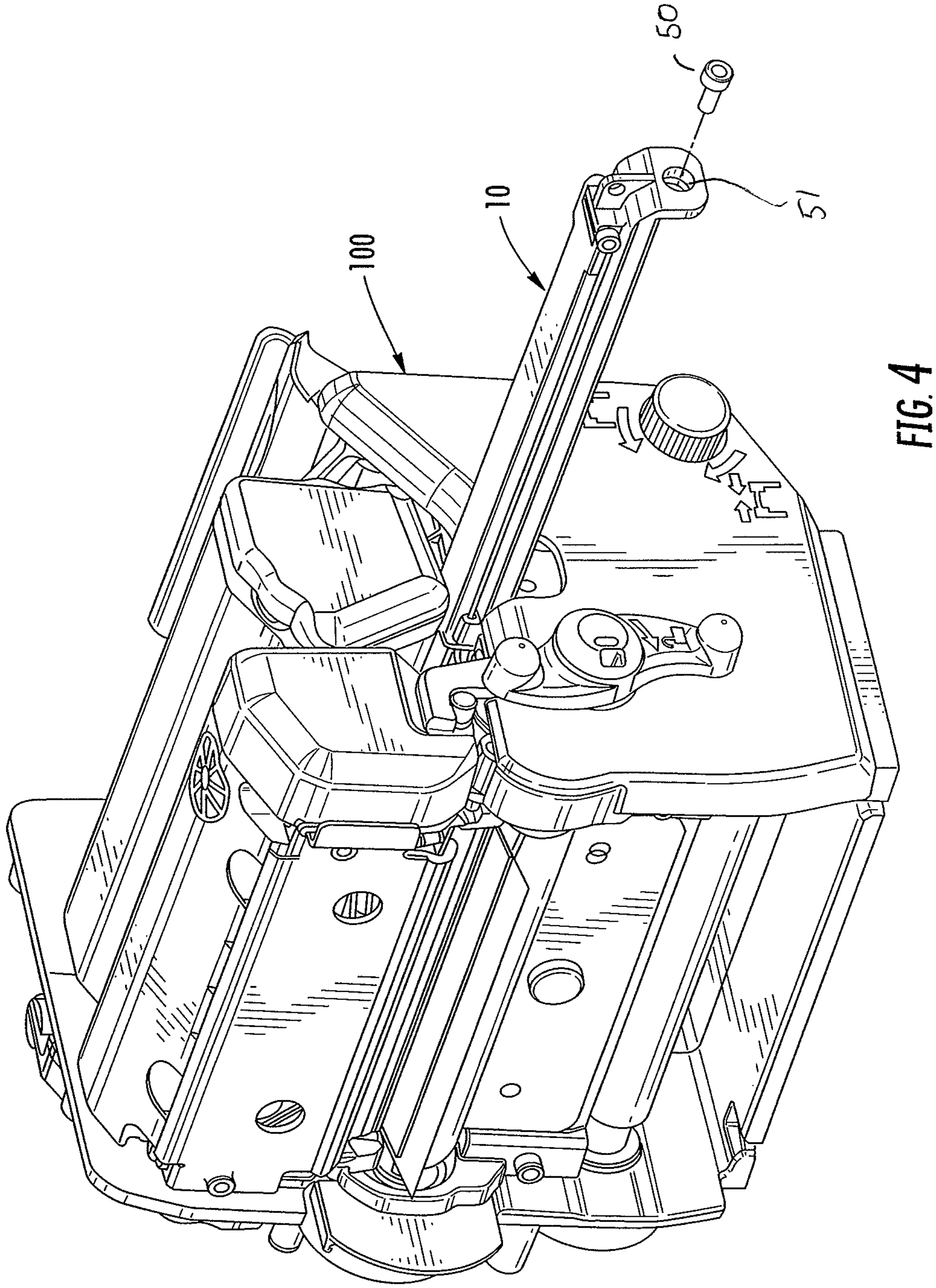
FIG. 4 is a perspective view of the top of form sensor of the embodiment of FIG. 1 shown in a partially installed position within a print station.

Integral to the base 14 is an interface connector 26 operable for providing a connection point between the sensor assembly 10 and the print station 100. The single connection point allows for a "plug in play" type installation and for easy removal for cleaning and maintenance of the print station 100 and the sensor assembly 10. Those skilled in the art will appreciate that the interface connector 26 is operable for connection to a control unit (not shown) of the print station 100 or a printer and for signaling the control unit of top of form data. In exemplary embodiments, the sensor assembly 10 is secured in place with a fastener 50 on the side of the base 14 opposed the interface connector 26. As best shown in FIG. 4, the fastener 50 may be an aperture 51 having a screw type device or other fastening device extending there through and into a print station wall which. It will be understood by those skilled in the art that regardless of the fastener type, it is configured for securing the sensor 10 in place within the print station 100

Figure 3A:
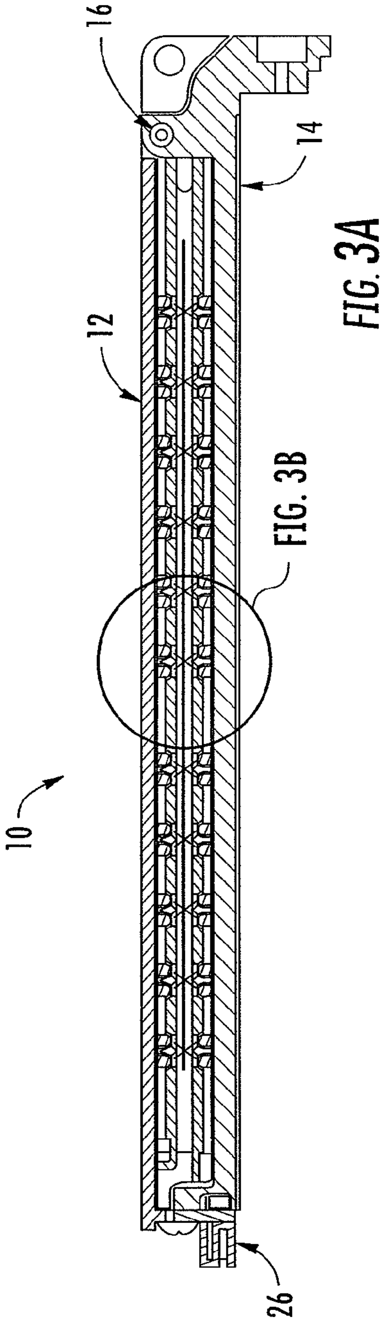
FIG. 3A is a cross-sectional view having a detailed view of the embodiment of FIG. 1.
Figure 3B:
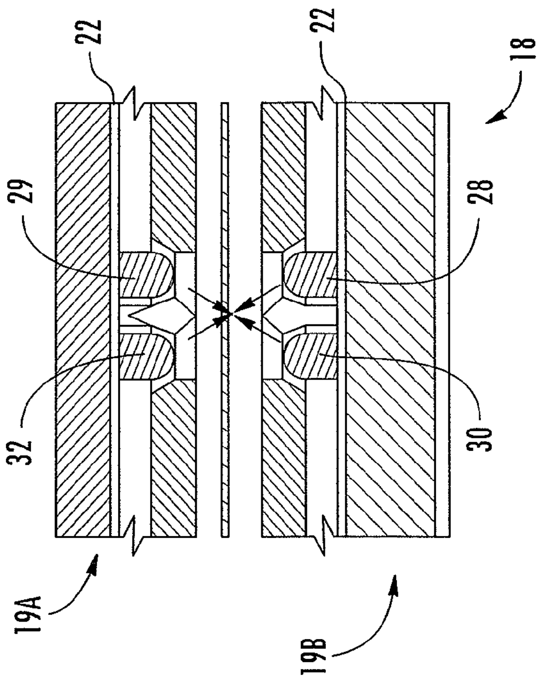
FIG. 3B is a cross-sectional view of a portion of the embodiment of FIG. 1.

Referring now to FIGS. 3A and 3B, a detailed cross-sectional view of the sensor assembly 10 is shown. As shown, a LED1 28, LED2 32, photo device1 29 and photo device2 30 are provided for sensing either a gap or notch in a media passing through the assembly 10. In operation, LED1 28 emits a beam of light that is detected by Photo device1 29. Photo device1 29 is sensitive enough to distinguish between label backing and label stock face sheet. Sensing holes or notches is similar to sensing label backing that is very translucent. For bottom reflective type sensing, LED1 28 emits a beam of light that is reflected back to Photo device2 30. The reflection is interrupted by a black mark to establish the top of form. Top reflective sensing, LED2 32 emits a beam of light that is reflected back to Photo device1 29. The reflection is interrupted by a black mark to establish the top of form. Narrow slots 34 in the sensor assembly 10 allow only a focused beam of light to be passed through to either of the photo devices. This allows for a tighter top-of-form registration by reducing the scattering of light.

The embodiments described above provide advantages over conventional devices and associated methods of manufacture. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Furthermore, the foregoing description of the preferred embodiment of the invention and best mode for practicing the invention are provided for the purpose of illustration only and not for the purpose of limitation—the invention being defined by the claims.

What is claimed is:

1. A sensing apparatus operable for sensing top of form indicators on media within a print station, the sensing apparatus comprising:

a base and a cover hingedly attached to each other and configured for manipulation between an open and closed position and for removable installation within a print station;

at least one flexible circuit affixed to interior surfaces of the base and the cover, the flexible circuit comprising a plurality of optical sensing devices; and an interface connector integral a distal end of the base for connection to a control unit of a print station, wherein the optical sensing devices are configured for the detection of media indicia located on a media passing through the sensing apparatus.

2. The sensing apparatus of claim 1, wherein the plurality of optical sensing devices comprise any one of light emitting diodes (LEDs) and photo sensors.

3. The sensing apparatus of claim 1, further comprising a fastener integral to the base and located on the opposite distal end of the interface connector.

4. The sensing apparatus of claim 1, wherein the indicia is holes, notches, slots, gaps in label stock, or black marks.

5. The sensing apparatus of claim 1, wherein the at least one flexible circuit is a single flexible circuit.

6. The sensing apparatus of claim 1, wherein the at least one flexible circuit further comprises a textured surface.

7. The sensing apparatus of claim 1, wherein the plurality of optical sensing devices are positioned at various locations along the length of the base and the cover.

8. The sensing apparatus of claim 1, wherein the optical sensing devices are light emitting diodes having light beams emitted therefrom with a predetermined intensity and wavelength for penetrating media passing through the sensing apparatus.

9. The sensing apparatus of claim 1, further comprising a pair of guides located at the distal end of the base and being configured to align upper and lower portions of the optical sensing devices when the sensing apparatus is manipulated to a closed position.

10. A sensing device operable for sensing top of form indicators on media within a print system, the sensing device comprising:

an elongated base hingedly attached to a corresponding elongated cover, said base and cover being configured for manipulation between an open and closed position and for removable installation within a print station of a printing system;

a single, flexible circuit affixed to interior surfaces of the base and the cover, the flexible circuit comprising an array of optical sensing devices; and an interface connector integral a distal end of the base for connection to a control unit of the print station, wherein the optical sensing devices are configured for the detection of holes, notches, slots, gaps in label stock, or black marks located on a media passing through the sensing apparatus.

11. The sensing device of claim 10, wherein the plurality of optical sensing devices comprise any one of light emitting diodes (LEDs) and photo sensors.

12. The sensing device of claim 10, further comprising a fastener integral to the base and located on the opposite distal end of the interface connector.

13. The sensing device of claim 10, wherein the flexible circuit further comprises a textured surface.

14. The sensing device of claim 10, wherein the plurality of optical sensing devices are positioned at various locations along the length of the base and the cover.

15. The sensing device of claim 10, wherein the optical sensing devices are light emitting diodes having light beams emitted therefrom with a predetermined intensity and wavelength for penetrating media passing through the sensing apparatus.

16. The sensing device of claim 10, further comprising a pair of guides located at the distal end of the base and being configured to align upper and lower portions of the optical sensing devices when the sensing apparatus is manipulated to a closed position.

17. The sensing device of claim 10, wherein the flexible circuit contains circuitry for multiplexing the output signals.

18. A sensing assembly operable for sensing top of form indicators on media, the sensing assembly comprising:

a base hingedly attached to a corresponding cover, said base and cover being configured for manipulation between an open and closed position and for removable installation within a print station of a printing system;

a flexible circuit affixed to interior surfaces of the base and the cover, the flexible circuit comprising an array of optical sensing devices and circuitry for multiplexing the output signals;

an interface connector integral a distal end of the base for connection to a control unit of the print station; and a fastener integral a distal end of the base opposite the interface connector for securing the sensor assembly within the print station, wherein the optical sensing devices are configured for the detection of holes, notches, slots, gaps in label stock, or black marks located on a media passing through the sensing apparatus.

* * * * *